United States Patent [19]

Thornton-Trump

[11] 4,032,090

[45] June 28, 1977

[54] METHOD FOR DEICING AIRCRAFT

[76] Inventor: Walter E. Thornton-Trump, 108 Bellvue Drive, Beaver Lake, Plattsmouth, Nebr. 68048

[22] Filed: July 21, 1975

[21] Appl. No.: 597,490

[52] U.S. Cl. .............................. 244/134 C; 106/13; 126/271.1; 134/45; 134/123; 252/70
[51] Int. Cl.² ........................................ B64D 15/10
[58] Field of Search ....... 244/134 R, 134 C, 134 B, 244/136, 114 R; 252/DIG. 10, 170, 70; 106/13; 37/12, 16; 114/40–42; 134/45, 123, 99, 172; 15/50; 126/271.1

[56] References Cited

UNITED STATES PATENTS

| | | | |
|---|---|---|---|
| 1,720,140 | 7/1929 | O'Connor | 244/134 C |
| 3,456,368 | 7/1969 | Jacques | 37/12 |
| 3,533,395 | 10/1970 | Yaste | 134/45 |
| 3,537,900 | 11/1970 | Halbert | 106/13 |
| 3,612,075 | 10/1971 | Cook | 134/123 |
| 3,878,804 | 4/1975 | Legerer | 114/40 |

FOREIGN PATENTS OR APPLICATIONS

| | | | |
|---|---|---|---|
| 767,362 | 3/1952 | Germany | 244/114 R |
| 2,343,389 | 3/1974 | Germany | 244/134 C |

*Primary Examiner*—Trygve M. Blix
*Assistant Examiner*—Galen L. Barefoot
*Attorney, Agent, or Firm*—Fich, Even, Tabin & Luedeka

[57] ABSTRACT

A method for deicing an aircraft having ice formed on its outer skin comprises heating a water solution substantially free of glycol to a temperature from approximately 160° to approximately 190° F. The water is then sprayed in a stream onto the skin under atmospheric conditions whereby the heated water will loosen the ice and wash the ice from the skin. The excess water solution which falls from the airplane is drained away. The heated water forms a film on the skin and warms the skin to prevent additional ice from forming thereon. Under certain atmospheric conditions, the heated water film will evaporate from the skin, thereby chilling the skin and drying it so as to minimize the sticking of blowing snow and ice on the skin. The method minimizes the amount of glycol required for anti-icing.

6 Claims, No Drawings

METHOD FOR DEICING AIRCRAFT

BACKGROUND OF THE INVENTION

The present invention relates to a method and means for deicing aircraft.

The term "deicing of aircraft" refers to the process of snow and ice removal from the surface of aircraft on the ground. This process has always been a time-consuming and expensive job. Studies have shown that at least 75% of all deicing is done between the temperatures of 24° and 38° F. Under these atmospheric conditions, the humidity, wind, barometric pressure, and precipitation conditions may vary.

Under presently known methods, the deicing of aircraft is accomplished by spraying a mixture of "glycol" and water on the aircraft. The term "glycol" is used in the art for deicing fluid commonly made up of a mixture of ethylene glycol, propylene glycol and certain other additives such as corrosion inhibitor, a wetting agent, and glucose, which make the fluid adhere to the appropriate surfaces while the airplane taxies to the end of the runway. There are many different deicing fluids on the market, and they are referred to hereinafter by the term "glycol." A primary attribute of the "glycol" is its ability not to freeze and also its ability to leave a thin film on the airplane after the excess fluid has drained off.

In the past, deicing has been a single operation wherein a 50/50 mixture of glycol and water was applied to remove snow and ice and the residue film provided an anti-icing function. By "anti-icing" is meant the provision of a thin film of antifreeze-like substance which protects the wings and skin of the airplane against formation of additional ice thereon. In these prior methods of deicing, the glycol was traditionally mixed with water in a 50/50 ratio.

This prior procedure always left a coating of glycol on the wings which was not always desirable, and in fact many times was undesirable because the ambient temperature could be low enough that dry precipitation (such as dry snow) could be coming down which would not stick to a clean dry wing, but which would stick to the wet glycol covered wing. Therefore, this prior method often caused undesirable buildup of sticking snow on the wings after the deicing operation.

The present invention improves upon the prior methods for deicing airplanes by separating the deicing and the anti-icing operations into two separate operations. In the deicing operation, a water solution substantially free of glycol is heated to a temperature of from approximately 160° F. to approximately 190° F. Once the water is heated, it is sprayed on the skin of the airplane. The heat of the water warms the wings and causes the ice to break loose and be washed away by the stream of water. When atmospheric conditions are suitable for evaporation, the water will evaporate into the air, and in so doing causes cooling and drying of the aircraft skin. This results in a cold, dry skin which is not susceptible to accumulating cold precipitation.

After the airplane has been deiced, the captain of the airplane can determine whether or not anti-icing is necessary. If the weather includes wet precipitation falling, the captain may determine that further anti-icing measures should be taken. In this case a thin film of glycol is sprayed on the airplane so as to provide an anti-freezing film on the outer surface of the aircraft. However, if a dry snow is falling, or if no snow at all is falling, there is no need for any anti-icing solution to be sprayed on the airplane after the deicing operation.

In the past, glycol was plentiful and reasonably priced. Recently the price of glycol has increased many fold over its earlier price, largely due to the fact that glycol is from ethylene stock which is mainly a by-product of natural gas, but which also comes from crude oil. In the past it was considered a waste product and surplus. However, recently ethylene has been used in producing synthetic fibers, and accordingly, a shortage of ethylene has developed as the demand for synthetic fibers has grown. The result has been a shortage of glycol and a corresponding increase in price. The present invention minimizes the use of glycol and for that reason is advantageous.

The ideal condition for the airplane during winter precipitation is to have the airplane skin clean, dry, and cold. If there is snow under these conditions, the snow does not stick to the skin and merely blows off like dust with a little movement of the aircraft or with a light breeze. However, if the skin is wet there is a tendency for the blowing snow to stick to the aircraft skin and form ice thereon.

Another problem encountered with present methods is the pollution factor of the runoff of glycol from the airplane during the deicing operation. Previously this runoff was directed towards drains and into conventional sewage systems. Airports which are being planned, under construction or in use are being restricted from dumping this deicing fluid down the drains.

Therefore, a primary object of the present invention is the provision of a method for deicing airplanes which economically utilizes deicing fluid.

A further object of the present invention is the provision of a method for deicing an airplane wherein the skin of the airplane is either cooled and dried or heated in such a manner to prevent ice thereon before the airplane is cleared for takeoff.

A further object of the present invention is the provision of a method for deicing airplanes wherein the amount of glycol used for deicing and anti-icing the airplane is minimized.

A further object of the present invention is the provision of a method which minimizes or eliminates the need for heating glycol and consequently is safer.

A further object of the present invention is the provision of a method and means for deicing airplanes wherein little or no glycol is drained off to conventional drainage systems after the deicing operation is complete.

A further object of the present invention is the provision to separate the process into two phases, that of ice or snow removal (deicing) and that of anti-icing.

A further object of the present invention is the provision of a method which is economical, efficient, and simple to employ.

DETAILED DESCRIPTION

While the method of the present invention may be carried out with varying types of equipment, it is contemplated that the operation be accomplished with a mobile vehicle having means thereof for heating and spraying the water on the aircraft. An example of such a unit is a model D-40 deicer truck unit sold by Trump, Inc., Plattsmouth, Neb. 68048. This unit comprises a truck having articulated booms thereon and a spray means for spraying a fluid onto the aircraft. The unit includes heaters, assemblies, pumps, holding tanks, and means for mixing varying mixtures of water and glycol prior to the time that this mixture is sprayed on the aircraft. One important feature of the present method is the heating of the water to the appropriate temperature. It has been found that heating the water to between 160° and 190° F. has produced the preferred result. It is important that the water not be heated to the point of creating steam inasmuch as the vaporization of the water must take place after it has been sprayed on the airplane. After the water has been heated, the process may be accomplished in two steps, i.e., deicing and anti-icing.

The deicing operation is accomplished by heating the water to the 160°–190° F. temperature. This heated water is then sprayed in a stream on the aircraft. Preferably the stream is not fine, but instead is concentrated so as to cause maximum heat transfer and to fully douse the surface of the aircraft and also to have the effect of washing away the snow and ice as it is loosened.

The water solution which is sprayed on the aircraft is preferably free from glycol. This is particularly true if the temperature of the atmosphere is between approximately 20° and 40° F. As the atmospheric temperature lowers below the above range, it may be desirable to mix a small portion of glycol into the solution sprayed on the aircraft especially to prevent ramp ice. However, this amount of glycol is in a very small percentage compared to the 50/50 ratio of glycol conventionally used. Under the new wet method only enough glycol is added to prevent the solution from freezing under the atmospheric temperature. Furthermore, nearly 75% of all deicing takes place when the atmospheric temperatures are between 20° and 40° F., and under these conditions it is not normally necessary to use any glycol at all in order to prevent freezing.

The effect of spraying the heated water on the aircraft varies depending upon the atmospheric conditions. If there is no precipitation and the temperature is at freezing or below, the scalding hot water heats the aircraft's surface slightly above the freezing point and leaves a film of warm water on the skin which has a thickness determined by the surface tension of the water and the contours of the aircraft surfaces. The remaining water drains off the aircraft. When the atmospheric conditions are at freezing or below, a boundary layer of air is warmed adjacent the film of warm water on the skin surface. This boundary layer of air is heated above the dew point and becomes capable of absorbing moisture. Evaporation of the water film begins, and for every pound of water that evaporates, the evaporative cooling process drains approximately 1100 BTU's of heat from the skin of the aircraft which is highly conductive and readily releases this heat. The effect of this process is the chilling of the skin of the aircraft below the freezing point and also the drying of the skin as the water evaporates therefrom. This creates ideal conditions for the aircraft, i.e., a clean, dry and cold skin surface.

The above described method is also advantageous from the standpoint of minimizing "ramp ice problems." Ramp ice problems develop from the water which drains off the aircraft. This water is directed toward a conventional drain. Because of the latent heat of fusion which requires the withdrawal of 144 BTU's per pound of water in order to freeze the water, there must be very cold ambient air to cause any ramp ice problems. The water, while cooled substantially from its 160°–190° F. temperature, still retains substantial heat and is very unlikely to freeze. If the ambient temperature is very low (at least 20° F.) ramp ice problems may be reduced by introducing a very small percentage of glycol into the water stream so as to lower its freezing point. Again this percentage need only be in the 5% to 10% range rather than in the 50% range used in conventional methods.

The present method reacts somewhat differently if atmospheric conditions are such that wet snow, freezing sleet, or high humidity conditions exist. In such a situation, there is no tendency of the hot water film to evaporate from the aircraft's skin. This particular atmospheric condition often occurs when the atmospheric temperatures are between 29° and 40° F. Under such conditions the present method operates effectively to prevent icing of the wings inasmuch as the scalding hot water warms the surface of the aircraft so as to prevent the freezing rain or ice or snow from forming ice on the aircraft surface.

Therefore, the present invention causes one of two reactions to take place. The 160°–190° F. water can actually cool the wings if the atmospheric conditions permit evaporation of the water from the aircraft skin. If the atmospheric condition does not permit this evaporation to take place, then the water does not evaporate, but it warms the wings so as to melt sleet, snow, etc. and to prevent the formation of ice thereon. While all the factors which enter into the cooling of the wings by application of scalding hot water are not completely understood, it is believed that the result is attributable to the fact that water will vaporize at any temperature. Thus the water vaporizes when it forms a film on the aircraft, and it can vaporize at a temperature which is substantially less than 212° F. This vaporization draws the heat out of the aircraft's skin which is formed of a highly conductive material. Thus it is entirely possible to cool the wings below a freezing temperature by spraying water of 160°–190° F. thereon.

After the ice and snow have been removed from the aircraft's skin, the captain of the aircraft can determine whether or not anti-icing steps should be taken. A certain anti-icing effect is obtained by the application of the scalding hot water which is substantially free from glycol. If the atmospheric temperature is substantially below freezing, and if the air is free from wet precipitation, it will not be necessary to take any further anti-icing steps. The aircraft's skin will have been chilled by the vaporization of the applied hot water, and even if additional precipitation is falling, it will not tend to stick to the cold dry skin.

However, if heavy or sticky snow or ice is falling, it may be desirable to take further anti-icing measures. This application of anti-icing fluid protects the aircraft from effects of continuing precipitation until the aircraft can start its takeoff run. Once the aircraft is moving, the precipitation will not settle on the aircraft's surfaces and of course once in flight, the aircraft has its own internal heating system for the vulnerable surfaces upon which ice might start to form.

If it is determined that anti-icing must be done, the aircraft is sprayed with a combination of water and glycol. The percentage of the glycol may be changed depending upon the weather conditions, but it is only necessary to select the amount of glycol which is necessary to prevent freezing of the solution when it is on the aircraft. The application of the anti-icing solution differs from the application of the deicing solution in that a "light dusting" of fluid is used rather than a concentrated stream of fluid. The effect of this dusting action is that a majority of the fluid stays on the aircraft's skin and very little runs off onto the ground or ramp. This is in contrast to the large amount of runoff onto the ramp and down the sewers which resulted from the use of 50/50 solution in prior methods.

The use of the above described methods to remove snow and ice with hot water eliminates entirely the running of glycol into the sewers during the snow and ice removal step. Even if a small amount of glycol is used for its antifreeze effect, there is a substantial reduction over prior methods. Furthermore, the anti-icing step minimizes the drainage of glycol into sewer systems because of the fact that a fog-like spray is used so as to minimize the runoff of glycol from the airplane.

Following are several examples of use of the present invention:

EXAMPLE I

Eight aircraft were deiced under weather conditions which included temperatures from 28° to 30° F. 2 to 3 inches of heavy wet snow were on the aircraft prior to deicing and approximately 6 inches were at the base of the wings. Hot water alone was used to remove the snow. Then the anti-icing procedure using a mixture of 30% glycol and 70% water was applied to the control points of the aircraft. The heat from the hot water warmed the skin and the water evaporated and left the wings dry. The anti-icing fluid was only necessary for pockets and/or control joints. The total fluid which was used was 4420 gallons which included glycol in the amount of 150 gallons. The average glycol used per aircraft was 18.75 gallons. No glycol was utilized during the deicing operation, and glycol was only used in a 30% ratio for the anti-icing operation. If 50/50 mixture were used, one half of 4420 or 2210 gallons would have been used as opposed to 150 gallons which were used.

EXAMPLE II

Six aircraft were deiced under atmospheric conditions of 25° F. with blowing wind of approximately 10–15 miles per hour. There were approximately 2 to 3 inches of heavy snow on the aircraft and the snow was continuing during the deicing operation. Hot water alone was used to remove the snow, and the hot water first warmed the skin, then evaporated and left the skin cold and dry. Anti-icing fluid was then applied utilizing a glycol solution of 30% glycol and 70% water. The anti-icing fluid was sprayed only on control points with a fine dust spray so as to minimize runoff. Total gallons used were 2175, and the total glycol used was 161 gallons. The average glycol per aircraft was 27 gallons. Under the prior 50/50 mix 1087 gallons glycol would have been used as opposed to 161 gallons which were used.

EXAMPLE III

Twenty aircraft were deiced under atmospheric conditions wherein the temperature ranged from 26° to 28° F. The precipitation included both snow and sleet which continued throughout the deicing operation. There was an accumulation of snow and ice on the aircraft of approximately 1 inch. Hot water alone was applied to remove the snow and ice. The heat from the scalding hot water warmed the skin and the water evaporated and left the wings dry and cold. An anti-icing solution of 30% glycol and 70% water was then applied in a light dusting spray action to create anti-icing. The anti-icing fluid was applied to pockets and/or control joints only. The total gallons used were 3825 with the total amount of glycol comprising approximately 300 gallons.

Under the prior 50/50 glycol mix 1912 gallons of glycol would have been used as opposed to the 300 gallons which were used.

Thus it can be seen that the device accomplishes at least all of its stated objectives.

What is claimed is:

1. A method for selectively de-icing and anti-icing aircraft in a manner whereby the amount of glycol used is considerably reduced, said aircraft being exposed to atmospheric conditions at an airport ramp or the like, said aircraft having ice or snow on its outer skin, said method comprising:

de-icing said aircraft when the atmospheric temperature is within the range of about 20° F to about 40° F by heating a de-icing liquid solution which essentially comprises water and is substantially free of glycol to a temperature within the range of about 160° F to about 190° F, directing a concentrated stream of said de-icing solution having a temperature within said temperature range toward said skin whereby said de-icing solution strikes said skin and warms the same, loosens said ice and snow and washes generally all of said ice and snow from said skin, said heated solution first forming a film on said skin which warms said skin to prevent additional ice from forming on said skin, said film of water evaporating so as to chill and dry said skin which prevents snow and ice from adhering thereto;

de-icing said aircraft when the atmospheric temperature is below about 20° F by heating a de-icing liquid solution comprising up to about 10% glycol with the remainder essentially water to a temperature within the range of about 160° F to about 190° F, said glycol being added to prevent ramp ice after said solution has run off said aircraft, directing a concentrated stream of said de-icing solution having a temperature within said temperature range toward said skin whereby said de-icing solution strikes said skin and warms the same, loosens said ice and snow and washes generally all of said ice and snow from said skin, said heated solution first forming a film on said skin which warms said skin to prevent additional ice from forming on said skin, said film of water evaporating so as to chill and dry said skin which prevents snow and ice from adhering thereto;

anti-icing said de-iced aircraft when atmospheric conditions are such that ice and snow will adhere to the cold and dry aircraft skin by spraying said de-iced aircraft with an anti-icing solution having a significant proportion of glycol, said solution being directed toward said aircraft skin in a fine spray so that a thin dust coat of solution is provided on said skin and run off of said solution is minimized.

2. A method as defined in claim 1 wherein said anti-icing solution has up to about 30% glycol.

3. A method of de-icing aircraft and anti-icing the same to prevent buildup of ice and snow thereon comprising the steps of:

de-icing said aircraft by heating a de-icing solution substantially comprising water when the atmospheric temperature is at or above 20° F, said solution being heated to a temperature within the range of about 160° F to about 190° F and directing the said de-icing solution toward the skin of said aircraft in a concentrated flow to maximize the heat transfer of said heated solution to said skin and to also wash away any snow and ice that is present thereon;

anti-icing said aircraft by spraying a foglike spray to provide said skin with a thin dust coat with an anti-icing solution substantially comprising water and a predetermined low percentage of about 30% glycol in sufficient quantity that run off of said anti-icing is almost eliminated;

the combination of said de-icing and anti-icing steps resulting in virtually no run off of glycol onto the ground.

4. A method for de-icing and anti-icing an aircraft exposed to atmospheric conditions on a ramp and limiting the amount of glycol solution used, said method comprising the steps of:

heating a water solution substantially free of glycol to a temperature of from about 160° F to 190° F to provide a heated de-icing liquid;

spraying said de-icing liquid at a temperature within said range toward the skin of the aircraft with a concentrated stream to warm the plane's skin and to force generally all of the ice or snow from the skin of the aircraft and with a high rate of run off of de-icing liquid from the aircraft;

subsequently mixing glycol and the heated water solution to provide anti-icing liquid with a predetermined concentration of glycol therein; and spraying the anti-icing liquid onto the de-iced aircraft with a fine spray and with significantly less run off of anti-icing liquid from the aircraft than of the de-icing liquid thereby conserving the amount of glycol used for de-icing and anti-icing.

5. A method in accordance with claim 4 including the further step of adding to the de-icing liquid before spraying thereon a concentration of glycol substantially less than that used for anti-icing but sufficient to prevent freezing of the de-icing liquid on the ramp thereby conserving on the glycol being used over a constant concentration thereof.

6. A method in accordance with claim 5 in which said anti-icing liquid is sprayed with a foglike dusting spray to coat the surface with glycol.

* * * * *